(12) United States Patent
Zhao et al.

(10) Patent No.: US 9,536,283 B2
(45) Date of Patent: Jan. 3, 2017

(54) DISPLAY METHOD AND ELECTRONIC APPARATUS

(71) Applicants: Beijing Lenovo Software, Ltd., Haidian District, Beijing (CN); Lenovo (Beijing) Co., Ltd., Haidian District, Beijing (CN)

(72) Inventors: Gaofei Zhao, Beijing (CN); Zhenhua Zhang, Beijing (CN); Rong Shi, Beijing (CN); Ke Shang, Beijing (CN); Lei Yu, Beijing (CN); Guilong Tan, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/348,752

(22) PCT Filed: Sep. 25, 2013

(86) PCT No.: PCT/CN2013/084221
§ 371 (c)(1),
(2) Date: Mar. 31, 2014

(87) PCT Pub. No.: WO2014/048326
PCT Pub. Date: Apr. 3, 2014

(65) Prior Publication Data
US 2015/0269709 A1    Sep. 24, 2015

(30) Foreign Application Priority Data

Sep. 26, 2012 (CN) .......................... 2012 1 0364675
Jun. 18, 2013 (CN) .......................... 2013 1 0241722

(51) Int. Cl.
*G06T 3/40* (2006.01)
*H04M 1/725* (2006.01)
(Continued)

(52) U.S. Cl.
CPC .......... *G06T 3/4092* (2013.01); *G09G 3/2096* (2013.01); *G09G 3/3406* (2013.01); *G09G 5/10* (2013.01);
(Continued)

(58) Field of Classification Search
CPC .... H04N 19/103; H04N 19/112; H04N 19/16; G09G 2320/0233; G09G 2320/0626
See application file for complete search history.

(56) References Cited

U.S. PATENT DOCUMENTS 6,744,460 B1   6/2004   Nimri et al.
8,139,023 B2   3/2012   Zhen
(Continued)

FOREIGN PATENT DOCUMENTS

CN   1882106     12/2006
CN   101404144   4/2009
(Continued)

OTHER PUBLICATIONS

CN 201210364675.5 First Office Action dated Jan. 13, 2015 (15 pages including English translation).
(Continued)

*Primary Examiner* — Antonio A Caschera
(74) *Attorney, Agent, or Firm* — Brinks Gilson & Lione; G. Peter Nichols (57) ABSTRACT

A display method and an electronic apparatus include a display unit with various kinds of different display modes, so that when the current display mode of the display unit is the first display mode, the first application in the electronic apparatus is initiated, and then the electronic apparatus (Continued)

detects the first parameter information of the first application, and then determines the correspondence relationship between the first parameter information and the display modes, determines the second display mode corresponding to the first parameter information, and adjusts the display unit from the first display mode displayed currently to the second display mode at last. Determining the display modes according to different applications running in the electronic apparatus increases the display effect of the electronic apparatus and reduces the power consumption of the display of the electronic apparatus.

15 Claims, 3 Drawing Sheets

(51) Int. Cl.
<table>
<tr><td>G09G 3/20</td><td>(2006.01)</td></tr>
<tr><td>G09G 3/34</td><td>(2006.01)</td></tr>
<tr><td>G09G 5/10</td><td>(2006.01)</td></tr>
<tr><td>H04W 52/02</td><td>(2009.01)</td></tr>
</table>

(52) U.S. Cl.
CPC ... *H04M 1/72519* (2013.01); *G09G 2320/043* (2013.01); *G09G 2320/0626* (2013.01); *G09G 2340/0407* (2013.01); *G09G 2340/0442* (2013.01); *G09G 2354/00* (2013.01); *H04W 52/0267* (2013.01)

(56) References Cited

U.S. PATENT DOCUMENTS

<table>
<tr><td>9,087,469 B2</td><td>7/2015</td><td>Xu</td><td></td></tr>
<tr><td>2006/0227122 A1</td><td>10/2006</td><td>Proctor</td><td></td></tr>
<tr><td>2006/0279750 A1</td><td>12/2006</td><td>Ha</td><td></td></tr>
<tr><td>2009/0140971 A1</td><td>6/2009</td><td>Hernandez</td><td></td></tr>
<tr><td>2010/0039566 A1</td><td>2/2010</td><td>Kim</td><td></td></tr>
<tr><td>2012/0162367 A1</td><td>6/2012</td><td>Ha</td><td></td></tr>
<tr><td>2013/0135354 A1*</td><td>5/2013</td><td>Ookawara</td><td>G09G 3/3406<br>345/660</td></tr>
</table>

FOREIGN PATENT DOCUMENTS

<table>
<tr><td>CN</td><td>101930719</td><td>12/2010</td></tr>
<tr><td>CN</td><td>102117207</td><td>7/2011</td></tr>
<tr><td>CN</td><td>102148020</td><td>8/2011</td></tr>
<tr><td>CN</td><td>102654816</td><td>9/2012</td></tr>
<tr><td>EP</td><td>1 737 248</td><td>12/2006</td></tr>
<tr><td>EP</td><td>2 521 119</td><td>11/2012</td></tr>
<tr><td>KR</td><td>2008 0041787</td><td>5/2008</td></tr>
</table>

OTHER PUBLICATIONS

PCT/CN2013/084221 International Search Report dated Jan. 2, 2014 (4 pages including English translation).
PCT/CN2013/084221 Written Opinion of the International Searching Authority dated Jan. 2, 2014 (18 pages including English translation).
PCT/CN2013/084221 International Preliminary Report on Patentability dated Mar. 31, 2015 (7 pages).
Chinese Second Office Action dated Jun. 25, 2015 for related Application No. 201210364675.5 (7 pages including English translation).
Office Action dated Dec. 21, 2015 out of corresponding German priority Application No. 112013000202.7 (13 pages including English translation).
Office Action dated May 6, 2016 out of corresponding German Application No. 11 2013 000 202.7 (4 pages including English translation).

* cited by examiner

DISPLAY METHOD AND ELECTRONIC APPARATUS

This application claims priority to International Application No. PCT/CN2013/084221 filed Sep. 25, 2013; Chinese Patent Appln. 201210364675.5 filed Sep. 26, 2012 and Chinese Patent Appln. 201310241722.1 filed Jun. 18, 2013; the entire contents of each are incorporated herein by reference.

BACKGROUND

The embodiment of the present invention relates to the field of electronic technology, and in particular relates to a display method and an electronic apparatus.

With the progressive development of science and technique, the electronic technology has got fast development, and the kinds of the electronic products is more and more, so people can enjoy various convenience brought by the development of the science and technique. Now, people can enjoy comfortable life brought by the development of the science and technique through various kinds of electronic apparatus. For example, the electronic apparatus such as a smart phone, a computer or the like has become an important constituted part of human's life, the user can use the electronic apparatus such as the smart phone, the computer or the like to view a movie or view an e-book or the like, to relieve pressure brought by a fast paced life of the modern times.

And, with the improvement of the electronic technology, the processing capacity and function of the electronic product, for example the current mobile phone have improved significantly. The mobile phone in the prior arts has a touch display screen, and the touch display screen of the mobile phone can provide display effect of a larger region to the user, thus provide better operational space to the user.

Therefore, in order to make the mobile phone have better display effect in the prior arts, a CABC (Content Adaptive Brightness Control), i.e., a content adaptive brightness adjusting mode is provided in the mobile phone, so the mobile phone can obtain different display effects for a plurality of CABC modes of the screen, and the CABC specifically includes the following two display modes:

a CABC MOVE mode saves the power more but has poorer display effect in certain cases (for example: camera, picture gallery, video playing);

A CABC UI mode has better display effect but has higher power consumption as compared to the CABC MOVE mode.

Therefore, the inventor finds out that there are the following problems and defects in the prior arts in the procedure of implementing the present invention:

The electronic apparatus can't adjust the display modes automatically according to program running in the electronic apparatus, so that the display effect of the electronic apparatus is poor under different display situations in the electronic apparatus, which degrades display efficiency of the electronic apparatus.

The electronic apparatus can't adjust the display modes automatically according to program running in the electronic apparatus so that the power consumption of display of the electronic apparatus increases.

SUMMARY

The embodiments of the present invention provide a display method and an electronic apparatus for solving the technical problem that the electronic apparatus can't adjust the display modes automatically according to programs running in the electronic apparatus, the specific technical solutions are as follows:

A display method applied in an electronic apparatus including a display unit having various kinds of different display modes, the method includes:

Initiating a first application in the electronic apparatus when current display mode of the display unit is a first display mode;

Acquiring first parameter information of the first application;

Determining a second display mode corresponding to the first parameter information according to the first parameter information and preset correspondence relationship between the parameter information and the display modes;

Adjusting the display unit from the first display mode displayed currently to a second display mode which is different from the first display mode.

Optionally, acquiring the first parameter information of the first application is specifically: acquiring first display brightness parameter information of the first application.

Optionally, determining the second display mode corresponding to the first parameter information according to the first parameter information and the preset correspondence relationship between the parameter information and the display modes includes:

Deciding whether the first display brightness parameter information satisfies a preset display brightness parameter information and generating a decision result;

If the decision result represents that the first display brightness parameter information satisfies the preset display brightness parameter information, the display mode corresponding to the first display brightness parameter information is determined as the second display mode based on the correspondence relationship between the display brightness parameter information and the display modes.

Optionally, deciding whether the first display brightness parameter information satisfies the preset display brightness parameter information and generating the decision result is specifically:

Deciding whether the first display brightness parameter information satisfies the preset display brightness parameter information in the second display mode.

Optionally, adjusting the current display mode of the display unit from the first display mode to the second display mode that is different from the first display mode is specifically:

Adjusting the display brightness parameter information of the display unit from the first display brightness parameter information of the first display mode to the preset display brightness parameter information of the second display mode.

Optionally, after deciding whether the first display brightness parameter information satisfies the preset display brightness parameter information of the second display mode, the method further includes:

If it decides that the first display brightness parameter information does not satisfy the preset display brightness parameter information of the second display mode, keeping the current display mode of the application as the first display mode.

Optionally, the first display mode is the CABC MOVE display mode or the CABC UI display mode.

Optionally, the second display mode is the CABC MOVE display mode or the CABC UI display mode.

An electronic apparatus including a display unit at least having various kinds of different display modes, the electronic apparatus further includes:

An initiating unit for initiating a first application in the electronic apparatus when current display mode of the display unit is a first display mode;

An acquiring unit for acquiring first parameter information of the first application;

A determining unit for determining a second display mode corresponding to the first parameter information according to the first parameter information and preset correspondence relationship between the parameter information and the display modes;

An adjusting unit for adjusting the display unit from the first display mode displayed currently to a second display mode which is different from the first display mode.

Optionally, the determining unit includes:

A deciding module for deciding whether the first display brightness parameter information satisfies preset display brightness parameter information and generating a decision result;

A determining module for determining the display mode corresponding to the first display brightness parameter information as the second display mode based on the correspondence relationship between the display brightness parameter information and the display modes if the decision result represents that the first display brightness parameter information satisfies the preset display brightness parameter information.

One or more embodiments provided by the embodiments of the present invention at least have the following technical effects or advantages:

The embodiments of the present invention provides the display method and the electronic apparatus, the electronic apparatus includes the display unit, and the display unit has various kinds of different display modes, so that when the current display mode of the display unit is the first display mode, the first application in the electronic apparatus is initiated, and then the electronic apparatus detects the first parameter information of the first application, and then determines the correspondence relationship between the first parameter information and the display modes, determines the second display mode corresponding to the first parameter information, and adjusts the display unit from the first display mode displayed currently to the second display mode that is different from the first display mode at last. Thus, it implements determining the display modes according to different applications running in the electronic apparatus, so as to improve display effect of the electronic apparatus and reduce the power consumption of display of the electronic apparatus.

DETAILED DESCRIPTION

The embodiments of the present invention provides a display method and an electronic apparatus, the electronic apparatus includes a display unit, and the display unit has various kinds of different display modes, so that when a current display mode of the display unit is a first display mode, a first application in the electronic apparatus is initiated, and then the electronic apparatus detects first parameter information of the first application, and then determines correspondence relationship between the first parameter information and the display modes, determines a second display mode corresponding to the first parameter information, and adjusts the display unit from the first display mode displayed currently to the second display mode that is different from the first display mode at last. Thus, it implements determining the display modes according to different applications running in the electronic apparatus, so as to improve display effect of the electronic apparatus and reduce the power consumption of display of the electronic apparatus.

The technical solutions of the present invention are described detailed in combination with the accompanying drawings and specific embodiments. It should understand that, the embodiments of the present invention are only detailed description of the technical solutions of the present invention, but not restriction to the technical solutions of the present invention. And, the embodiments of the present invention and the technical features in the embodiments can be combined with each other in case of being not conflicting.

The embodiment of the present invention provides a display method, and firstly, the display method is applied in an electronic apparatus including a display unit having various kinds of different display modes, in particular, the user can determine to start which kind of modes to display according to his selection, and use different display modes for displaying in different requirements for displaying.

Figure 1:
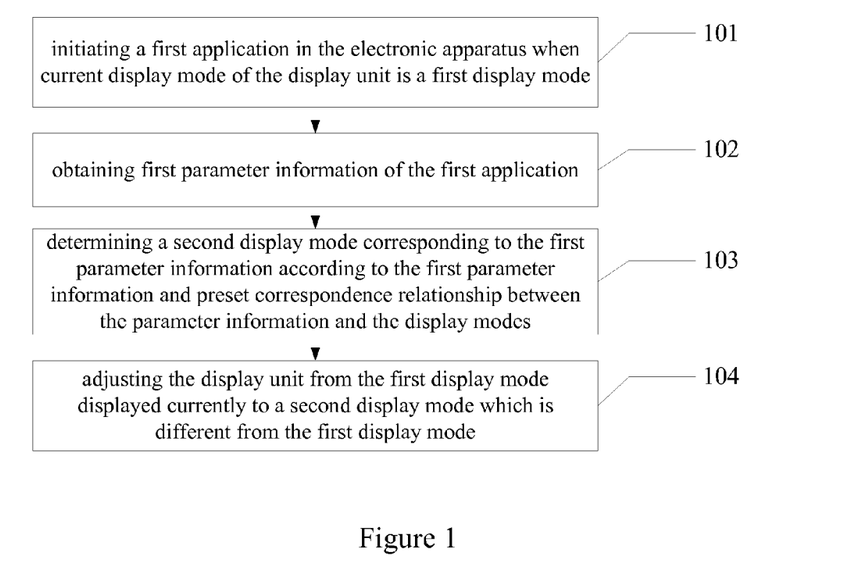
FIG. 1 is a flow chart of the display method of the first embodiment of the present invention.

FIG. 1 is a flow chart of the display method of the first embodiment of the present invention, and the method includes the following steps:

Step 101, initiating a first application in the electronic apparatus when current display mode of the display unit is a first display mode.

Step 102, acquiring first parameter information of the first application.

Step 103, determining a second display mode corresponding to the first parameter information according to the first parameter information and preset correspondence relationship between the parameter information and the display modes.

Step 104, adjusting the display unit from the first display mode displayed currently to the second display mode that is different from the first display mode.

Firstly, in step 101, when the current display mode of the electronic apparatus is the first display mode, if the first display mode is a display mode which has better display effect and higher power consumption, a detecting unit in the electronic apparatus detects the first application running in the electronic apparatus in real time, and the electronic apparatus parses operational parameter information of the first application at this time and acquires the first parameter information corresponding to the first application.

After acquiring the first parameter information, the electronic apparatus acquires first display brightness parameter information required by the first application in the first parameter information when the first application runs in the electronic apparatus.

Further, in the embodiments of the present invention, in order to make the first display brightness parameter information to correspond to the corresponding display mode, the electronic apparatus stores the correspondence relationship between the parameter information and the display modes in advance in the embodiments of the present invention. That is, the correspondence relationship between the display brightness parameter information and the display mode is pre-stored in the electronic apparatus, and the display brightness parameter information may be a range of the display brightness or may be a certain value of the display brightness.

The electronic apparatus decides whether first display brightness parameter information satisfies preset display brightness parameter information based on the acquired first display brightness parameter information and the preset display brightness parameter information, and generates a decision result. If the decision result shows that the first display brightness parameter information satisfies the preset display brightness parameter information, the display mode corresponding to the first display brightness parameter information is determined as the second display mode based on the correspondence relationship between the display brightness parameter information and the display modes.

In particular, when the pre-stored display brightness parameter information is the range of the display brightness, it determines whether the first display brightness parameter information is within the preset range of the display brightness. For example, when a first value of the display brightness in the first display brightness parameter information is 50 (lm) and the preset range of the display brightness is (40-100) lm, it determines that the first value of the display brightness is within the preset range of the display brightness, and then the electronic apparatus decides that the first display brightness parameter information satisfies the preset condition.

And, when the pre-stored display brightness parameter information is a certain value of the display brightness, for example, 80 (lm), then the electronic apparatus compares the first value of the display brightness in the first display brightness parameter information with the preset value of the display brightness, and determines whether the first value of the display brightness exceeds the preset value of the display brightness. If the first value of the display brightness exceeds the preset value of the display brightness, the electronic apparatus decides that the first display brightness value satisfies the preset condition, and determines that the display mode corresponding to the first display brightness parameter information is the second display mode.

After it decides that the first display brightness parameter information satisfies the preset condition, the electronic apparatus adjusts the display unit from the first display mode operated currently to the second display mode that is different from the first display mode.

Thus, the corresponding display mode is adjusted to the value of the display brightness that is coincident with the requirement of display of the application by parsing and deciding the parameter information in the application, so as to implement automatic adjustment of the display mode of the electronic apparatus according to the program running in the electronic apparatus, and in turn improve display effect of the electronic apparatus under different display situations in the electronic apparatus, and reduce power consumption of display effectively in case of limited display effect.

Of course, in the embodiment of the present invention, if the first display brightness parameter information does not satisfy the preset condition, the electronic apparatus would execute the original display mode.

The technical solutions of the embodiments of the present invention are further explained by specific applied scene as follows.

In this embodiment, the electronic apparatus is a mobile phone in which the CABC (Content Adaptive Brightness Control) content adaptive brightness adjustment is provided, and the display modes of the mobile phone under this display setting may be the CABC MOVE display mode or the CABC UI display mode. In the prior arts, the user can adjust the display modes between the CABC MOVE display mode and the CABC UI display mode according to his own requirement so as to implement better display effect. However, such manner of adjusting manually by the user can't achieve optimal display efficiency, and it makes the procedure of switching display complex, and also makes the operational procedure of the user complex.

Therefore, in the embodiment of the present invention, a system service which is able to determine the display mode required by the application according to the application in the mobile phone is provided in the mobile phone. Firstly, the display mode of the mobile phone is the CABC MOVE display mode, and in this display mode, the power consumption of display in the electronic apparatus is less, but the display effect of this display mode is poorer at the time of shooting picture or playing video.

When the user uses software for video playing in the mobile phone to play video content, the system service in the mobile phone would detect running of the program of video player, and acquire display brightness parameter value of the program of the video player. And at the same time, the mobile phone would retrieve pre-stored preset display brightness parameter value which further corresponds to a specific display mode, and compare the display brightness parameter value and the preset display brightness parameter value, so as to determine whether the display brightness parameter value reaches the preset display brightness parameter value. And, the mobile phone determines that the display mode corresponding to the preset display brightness parameter value is the CABC UI display mode when the display brightness parameter value reaches the preset display brightness parameter value.

At last, after the mobile phone determines the CABC UI display mode, the display mode of the mobile phone is adjusted from the CABC MOVE display mode to the CABC UI display mode.

Of course, when the program running in the mobile phone is not the software for video playing but an application with lower power consumption, the mobile phone maintains the CABC MOVE display mode.

Of course, in the embodiments of the present invention, if an application with lower requirement of display effect is started in the mobile phone, the display screen in the mobile phone may also be switched from the CABC UI display mode to the CABC MOVE display mode.

The corresponding display mode is adjusted to the display brightness value that is coincident with the requirement for displaying of the application by parsing and deciding the parameter information in the application, so as to implement automatic adjustment of the display mode of the electronic apparatus according to the program running in the electronic apparatus, and in turn improve display effect of the electronic apparatus under different display situations in the electronic apparatus, and reduce the power consumption of display effectively in case of limited display effect.

Figure 2:
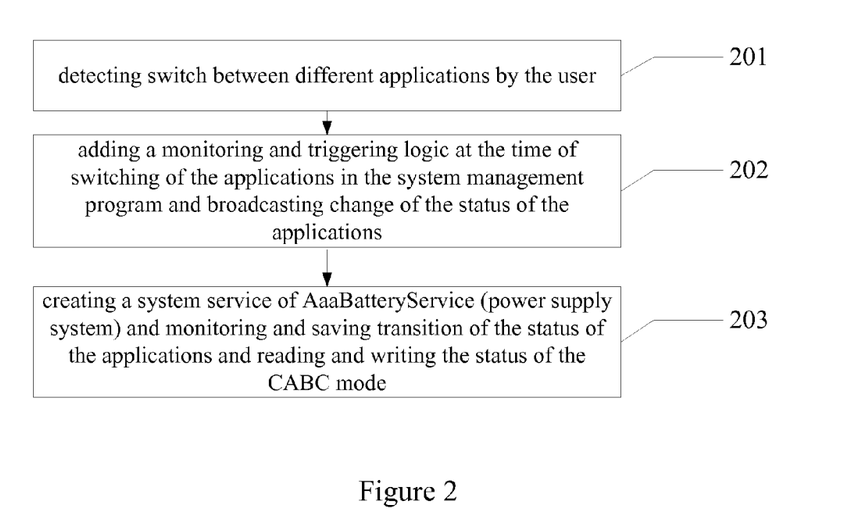
FIG. 2 is a flow chart of an applied scene of the display method of the first embodiment of the present invention.

Further, in the embodiment of the present invention, there also provides the flow chart of specific application of the method in the mobile phone, as shown in FIG. 2. FIG. 2 is the flow chart of the applied scene of the display method of the first embodiment of the present invention.

Step 201, detecting switch between different applications by the user.

For example, in the mobile phone, the mobile phone detects the operation of switching between different programs by the user in the mobile phone in real time. For example, when the user switches between the programs for video playing, networking and making phone call in the mobile phone, the mobile phone acquires parameter information of each application in real time. In particular, the step 201 is implemented in program application layer in the mobile phone.

Step 202, adding a monitoring and triggering logic at the time of switching of the applications in the system management program and broadcasting change of the status of the applications.

That is, a corresponding system management program is provided in the mobile phone and monitoring of the applications in real time is implemented by the system management program, i.e., transition of the applications is acquired in real time in the mobile phone and the transition of the status of the applications is broadcasted in the system.

Step 203, creating a system service of AaaBatteryService (power supply system) and monitoring and saving transition of the status of the applications and reading and writing the status of the CABC mode.

In particular, the set CABC is different modes according to the types of the applications (for example, applications for video playing, taking photo, networking or the like), a jni.cpp (JAVA local invocation) interface is applied, and the status is written into an Aaa_cabc driving file by means of an ioctl.

The specific procedure is establishing a standard misc_driver driving file Aaa_CABC in the system, and invoking the CABC interface of lcd driving in unlocked_ioctl of the misc_driver, so as to ultimately implement switching between the display modes of the display screen in the mobile phone according to the types of the applications in the system. So that the electronic apparatus can adjust the display modes automatically according to the program running in the electronic apparatus, which improves display effect of the electronic apparatus under different display situations in the electronic apparatus and reduces power consumption of display effectively in case of limited display effect.

Figure 3:
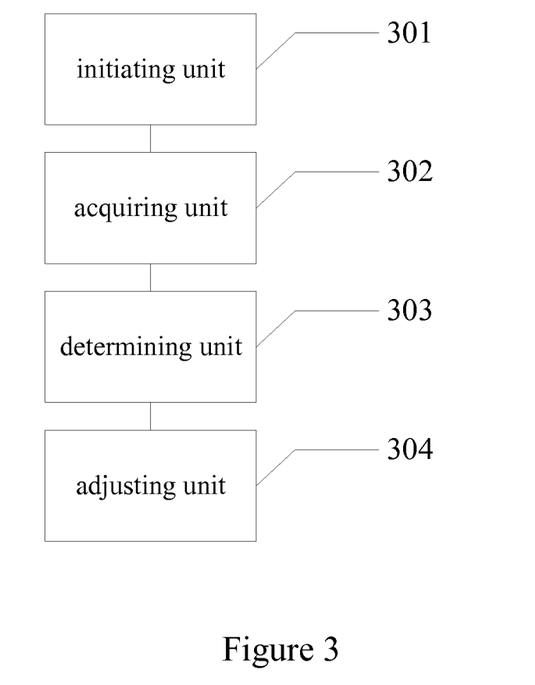
FIG. 3 is a schematic diagram of the specific structure of the electronic apparatus of the first embodiment of the present invention.

The embodiment of the present invention further provides an electronic apparatus corresponding to the display method provided by the embodiment of the present invention, as shown in FIG. 3. FIG. 3 is a schematic diagram of the specific structure of the electronic apparatus of the first embodiment of the present invention, the electronic apparatus includes:

An initiating unit 301 for initiating a first application in the electronic apparatus when a current display mode of the display unit is a first display mode.

An acquiring unit 302 for acquiring first parameter information of the first application;

A determining unit 303 for determining a second display mode corresponding to the first parameter information according to the first parameter information and preset correspondence relationship between the parameter information and the display modes;

An adjusting unit 304 for adjusting the display unit from the first display mode displayed currently to the second display mode which is different from the first display mode.

After the initiating unit 301 detects that the first application is started in the electronic apparatus, the electronic apparatus generates an acquiring instruction, and the acquiring instruction is send to the acquiring unit 302. The acquiring unit 302 acquires the first parameter information of the first application according to acquiring instruction, and sends the first parameter information to the determining unit 303 after acquiring the first parameter information, so that the determining unit 303 parses the first parameter information, and determines the second display mode corresponding to the first parameter information according to the preset correspondence relationship between the parameter information and the display modes. And, an adjusting instruction is generated to be sent to the adjusting unit 304, and then, the adjusting unit 304 adjusts the display unit of the electronic apparatus from the first display mode displayed currently to the second display mode that is different from the first display mode according to the adjusting instruction.

Figure 4:
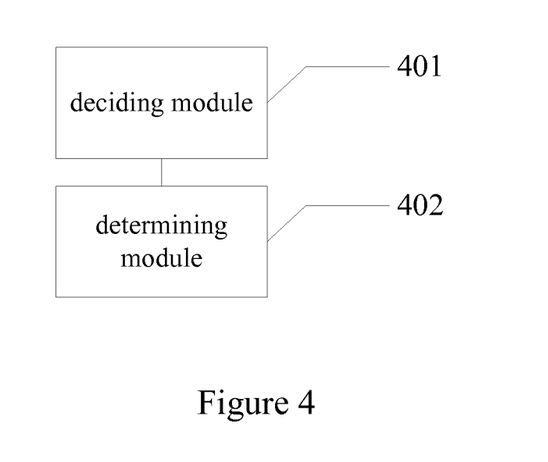
FIG. 4 is a schematic diagram of the specific structure of the determining unit of the first embodiment of the present invention.

FIG. 4 is a schematic diagram of the specific structure of the determining unit of the first embodiment of the present invention, the determining unit specifically includes:

A deciding module 401 for deciding whether the first display brightness parameter information satisfies the preset display brightness parameter information and generating a decision result;

A determining module 402 for determining the display mode corresponding to the first display brightness parameter information as the second display mode based on the correspondence relationship between the display brightness parameter information and the display modes if the decision result shows that the first display brightness parameter information satisfies the preset display brightness parameter information.

One or more embodiments provided by the present invention at least have the following technical effects or advantages:

The embodiments of the present invention provide a display method and an electronic apparatus, the electronic apparatus includes the display unit, and the display unit has various kinds of different display modes, so that when the current display mode of the display unit is the first display mode, the first application in the electronic apparatus is initiated, and then the electronic apparatus detects the first parameter information of the first application, and then determines the correspondence relationship between the first parameter information and the display modes, determines the second display mode corresponding to the first parameter information, and adjusts the display unit from the first display mode displayed currently to the second display mode that is different from the first display mode at last. Thus, it implements determining the display modes according to different applications running in the electronic apparatus, so as to improve display effect of the electronic apparatus and reduce the power consumption of display of the electronic apparatus.

The corresponding display mode is adjusted to the display brightness value which is coincident with the requirement for displaying of the applications by parsing and deciding the parameter information in the applications, so as to solve the technical problem that the electronic apparatus can't adjust the display modes automatically according to the program running in the electronic apparatus, and thus implement automatic adjustment of the display mode of the electronic apparatus according to the program running in the electronic apparatus.

The corresponding display mode is adjusted to the display brightness value and display mode that is coincident with the requirement for displaying of the application by parsing and deciding the parameter information in the application, so as to in turn improve display effect of the electronic apparatus under different display situations in the electronic apparatus, and reduce power consumption of display effectively in case of limited display effect.

Further, the inventor notes that, display settings of the display unit of the electronic apparatus such as the smart phone, the computer or the like are generally fixed settings presently, and if they are required to be modified, the display settings needs to be modified according to the adjusting instruction input by the user, and then the display effects are changed.

However, the inventor of this application found that the above-described technology at least has the following technical problems in the procedure of implementing the technical solution of the embodiments of the present invention:

Since the time length of using the electronic apparatus such as the smart phone, the computer or the like of the user become more and more, using a single display setting causes eye strain of the user easily. For example, a color temperature setting of 6500K can provide better display effect to the user at the time of viewing picture or video, but in some case that requires lower color representation, for example the case in which the user views webpage, edits text and edits program and so on, using the color temperature setting of 6500K causes eye strain of the user easily, and it is not suitable for long-time usage of the user. If the color temperature needs to be adjusted according to the content displayed on the display device, each time new content is displayed on the display unit, the electronic apparatus needs to adjust the display effect of the display unit according to the adjusting instruction input by the user, which may need the user to input the adjusting instruction plural times to achieve satisfactory effect expected by the user, thus the procedure is complex and time is wasted. Therefore, the manner of adjusting the display settings in the prior arts has technical problems that operational steps are complex and time is wasted.

The embodiments of the present invention solves the technical problems that the manner of adjusting the color temperature has complex steps and wastes time in the prior arts by further providing a display method and an electronic apparatus.

The embodiment of the present invention further provides a display method applied in an electronic apparatus including a display unit, the method includes: acquiring first type information of a first display object on a first display region of the display unit; obtaining first display parameter corresponding to the first type information based on correspondence relationship between the type information and display parameter; displaying the first display object on the first display region based on at least the first display parameter.

Optionally, before displaying the first display object on the first display region based on at least the first display parameter, the method further includes: obtaining a first environment brightness parameter of current environment where the electronic apparatus is; and displaying the first display object on the first display region based on at least the first display parameter is specifically: displaying the first display object on the first display region based on the first display parameter and the first environment brightness parameter.

Optionally, the first display parameter includes at least a first color temperature parameter and a first brightness parameter, and displaying the first display object on the first display region based on the first display parameter and the first environment brightness parameter specifically includes: adjusting color temperature value of the display unit based on the first color temperature parameter, adjusting brightness value of the display unit based on the first brightness parameter and the first environment brightness parameter, and displaying the first display object on the first display region of the display unit.

Optionally, when the first environment brightness parameter indicates that the illumination of the current environment is less than or equal to a first threshold, adjusting the brightness value of the display unit based on the first brightness parameter and the first environment brightness parameter is specifically: adjusting the brightness value of the display unit to a first preset brightness value based on the first brightness parameter and the first environment brightness parameter.

Optionally, when the first environment brightness parameter indicates that the illumination of the current environment is larger than or equal to a second threshold, adjusting the brightness value of the display unit based on the first brightness parameter and the first environment brightness parameter is specifically: adjusting the brightness value of the display unit to a second preset brightness value based on the first brightness parameter and the first environment brightness parameter.

Another aspect of the embodiment of the present invention further provide an electronic apparatus including: a case; a circuit board provided in the case; a display unit connected to the circuit board; a processor provided on the circuit board and for acquiring first type information of a first display object on a first display region of the display unit, and obtaining first display parameter corresponding to the first type information based on correspondence relationship between the type information and the display parameter, and displaying the first display object on the first display region based on at least the first display parameter.

Optionally, before displaying the first display object on the first display region based on at least the first display parameter, the processor is further specifically for obtaining a first environment brightness parameter of current environment where the electronic apparatus is; and displaying the first display object on the first display region based on the first display parameter and the first environment brightness parameter.

Optionally, the processor is specifically for displaying the first display object on the first display region based on the first display parameter and the first environment brightness parameter.

Optionally, when the first environment brightness parameter indicates that illumination of the current environment is less than or equal to a first threshold, the processor is specifically for adjusting the brightness value of the display unit to a first preset brightness value based on the first brightness parameter and the first environment brightness parameter.

Optionally, when the first environment brightness parameter indicates that the illumination of the current environment is larger than or equal to a second threshold, the processor is specifically for adjusting the brightness value of the display unit to a second preset brightness value based on the first brightness parameter and the first environment brightness parameter.

One or more technical solutions provided by the embodiments of the present invention at least have the following technical effects or advantages:

Since the technical solution in which the first display parameter is obtained according to the first type information of the first display object and the first display object is displayed on the first display region based on at least the first display parameter is adopted, the electronic apparatus does not need to adjust the display settings of the display unit according to the adjusting instruction input by the user to change the display effects of the electronic apparatus, so it solves technical problem that the operational steps is complex and time is wasted in the manner of adjusting the display settings in the prior arts, and implements technical effect of adjusting the display settings of the display unit automatically according to the display object on the display unit.

Hereinafter, the above-described display method and electronic apparatus are described detailed with reference to FIG. 5 and FIG. 6.

The second embodiment of the present invention solves the technical problem that the manner of adjusting the color temperature has complex steps and wastes time in the prior arts by further providing a display method and an electronic apparatus.

The technical solutions in the second embodiment of the present invention have an overall concept as follows for solving the above-described technical problem of complex steps and time consuming:

The embodiment of the present invention provides a display method applied in an electronic apparatus including a display unit, the method includes:

Firstly, first type information of a first display object on a first display region of the display unit is acquired;

Then, first display parameter corresponding to the first type information is obtained based on correspondence relationship between the type information and the display parameter;

At last, the first display object is displayed on the first display region based on at least the first display parameter.

It can be seen from the above-described part that, since the technical solution in which the first display parameter is obtained according to the first type information of the first display object and the first display object is displayed on the first display region based on at least the first display parameter is adopted, the electronic apparatus does not need to adjust the display settings of the display unit according to the adjusting instruction input by the user to change the display effects of the electronic apparatus, so it solves technical problem that the operational steps is complex and time is wasted in the manner of adjusting the display settings in the prior arts, and implements technical effect of adjusting the display settings of the display unit automatically according to the display object on the display unit.

In order to understand the above-described technical solution better, the above-described technical solution is explained detailed in combination with the accompanying drawings of the specification and the specific implementation modes.

The embodiment of the present invention provides a display method applied in an electronic apparatus including a display unit, in practical application, the electronic apparatus may be a smart phone, a tablet computer, or may be a desktop computer, a notebook computer, and the embodiment of the present invention does not make any restriction here.

Figure 5:
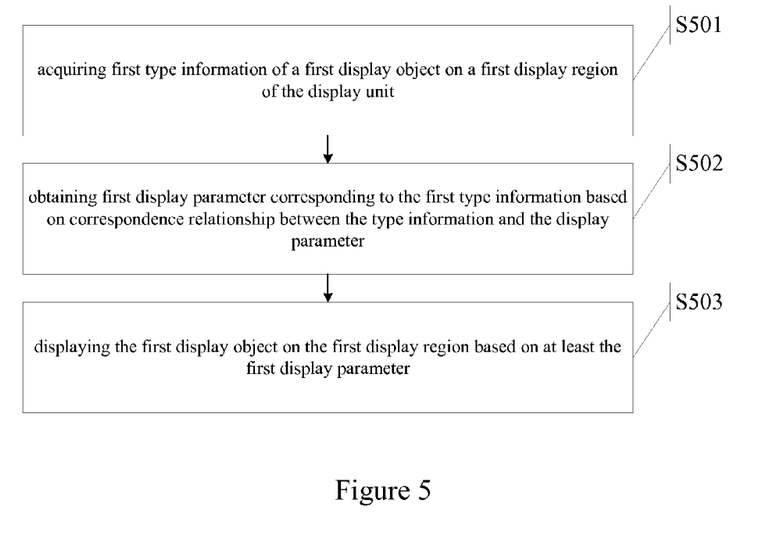
FIG. 5 is a flow chart of the display method of the second embodiment of the present invention.
Figure 6:
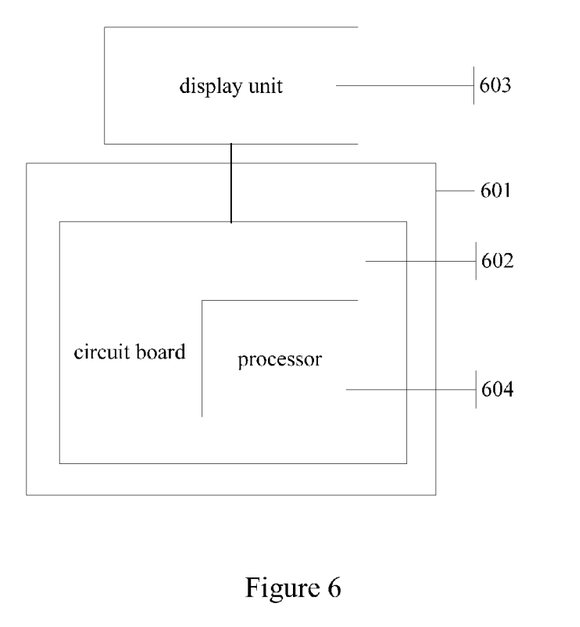
FIG. 6 is a functional block diagram of the electronic apparatus of the second embodiment of the present invention.

With reference to FIG. 5, FIG. 5 is a flow chart of the display method provided by the second embodiment of the present invention. And, as shown in FIG. 5, the method includes:

S501: first type information of a first display object on a first display region of the display unit is acquired;

S502: first display parameter corresponding to the first type information is obtained based on correspondence relationship between the type information and the display parameter;

S503: the first display object is displayed on the first display region based on at least the first display parameter.

In step S501, the correspondence relationship between the display objects and the types can be preset, for example, display object of a type of character may be set as a first type, display object of a type of picture may be set as a second type, and display object of a type of video may be set as a third type. Of course, in practical application, those skilled in art can set other display objects as suitable types according to practical situation, and it no longer describes here.

After setting the correspondence relationship between the display objects and the types, the first type information of the first display object can be acquired according to the first display object on the first display region of the display unit. For example, if the first display object is the display object of the type of document such as "WORD", "TXT" or the like, then the first type information indicating that the first display object is an application of the type of document can be obtained; if the first display object is an application of the type of picture, then the first type information indicating that the first display object is the application of the type of picture can be obtained; if an application corresponding to the first display object is the application of the type of video, then the first type information indicating that the first display object is the application of the type of video can be obtained, and so on. Here, the types are not listed one by one for simplicity of the specification.

Of course, in the specific implementation procedure, the first type information of the first display object may also be acquired according to the application corresponding to the first display object. In particular, in practical application, the display object of the display unit is started by an application corresponding to the system of the electronic apparatus. For example, taking a predetermined document on the electronic apparatus or a network server connected to the electronic apparatus being started using the application of "WORD" (a document editing software issued by Microsoft Corporation) as example, after opening the document using the "WORD" program, a window corresponding to the "WORD" program is displayed on the display unit of the electronic apparatus, for example, the display screen or the display, and the content of the document is displayed in this window. Of course, if the display object is a picture, a video or the like, the file corresponding to the display object is also started by the corresponding application, and then displayed on the display unit of the electronic apparatus, and it is no longer described here for simplicity. Therefore, the first type information of the first display object can be acquired according to the type of the application corresponding to the first display object, and it is no longer described here for simplicity.

Here, those skilled in the art can understand that, the application mentioned here can be the first application in the above-described first embodiment, and, other than obtaining the first type information of the first display object with the first application, the first parameter information of the first application mentioned in the above-described first embodiment can be used as the first type information of the first display object in certain cases. For example, when the application "WORD" runs, the parameter of the application "WORD" which represents that the document opened is the type of text can be obtained as the type information of text of the display object displayed by the application "WORD".

After obtaining the first type information of the first display object, the display method provided by the embodiment of the present invention proceeds to step S2, that is, obtaining the first display parameter corresponding to the first type information based on the correspondence relationship between the type information and the display parameter.

In step S2, the correspondence relationship between the type information and the display parameter may be stored in advance, and the display parameter may include a color temperature parameter, a brightness parameter and a contrast parameter or the like. For example, taking the display parameter corresponding to the display object of the type of character as example, the color temperature parameter value may be 5300K, the brightness parameter value may be 40%, and the contrast parameter may be 80%. In the display parameter corresponding to the display object of the type of picture, the color temperature parameter value may be 6500 k, the brightness parameter value may be 60%, and the contrast parameter value may be 90%. In the display parameter corresponding to the display object of the type of video, the color temperature parameter value may be 6500K, the brightness parameter value may be 80%, and the contrast parameter value may be 95%, and so on.

According to the first type information of the first display object acquired in step S1 and the correspondence relationship between the type information and the display parameter, the first display parameter corresponding to the first type information can be obtained, so as to display the first display object on the first display region of the display unit based on the first display parameter.

Since the ambient brightness of the external environment where the electronic apparatus is would change, for example, in term of day and night, the external light ray of day is relatively plenty, and the ambient brightness is relatively high, the user does not turn on a lamp to increase the ambient brightness generally. And, since the natural light in night is insufficient and the ambient brightness is relatively low, the user would turn on the lamp to increase the environmental brightness generally. Thus, in order to ensure that the brightness of the display unit of the electronic apparatus is in coincident with the ambient brightness, the brightness of the display unit needs to be adjusted properly. For example, in case that the ambient brightness is relatively high, the brightness of the display unit is adjusted higher to let the user see clearly, and in case that the ambient brightness is relatively low, the brightness of the display unit is adjusted lower to avoid stimulate eyes of the user.

Therefore, before displaying the first display object on the first display region based on the first display parameter, the display method provided by the embodiment of the present invention may also include: obtaining the first environment brightness parameter of the current environment where the electronic apparatus is. Of course, in practical application, if the brightness of the environment where the electronic apparatus is wouldn't change, for example, the light ray is provided by a constant lamp or there is no other light-source such as in a closed room, the brightness of the environment wouldn't change. At this time, it does not need to obtain the first environment brightness parameter of the current environment where the electronic apparatus is, and it is no longer described here for simplicity.

After obtaining the first display parameter and the first environment brightness parameter, the display method provided by the embodiment of the present invention proceeds to step S3, i.e., displaying the first display object on the first display region based on the first display parameter and the first environment brightness parameter.

In step S3, in particular, it may be adjusting the color temperature value of the display unit of the electronic apparatus based on the first color temperature parameter in the first display parameter, or adjusting the contrast value of the display unit based on the first contrast parameter in the first display parameter, or adjusting the brightness value of the display unit based on the first brightness parameter and the first environment brightness parameter in the first display parameter, and so on.

When the first environment brightness parameter indicates that the illumination of the current environment where the electronic apparatus is less than or equal to a first threshold and the first threshold is for example 100 lux (lux is the unit of the illumination), the brightness value of the display unit can be adjusted to a first preset brightness value, for example, 22 nit (nit is the unit of the brightness) based on the first brightness parameter and the first environment brightness parameter in the first display parameter, so as to provide fundamental illumination to the content displayed on the display unit while being coincident with the ambient brightness.

When the first environment brightness parameter indicates that the illumination of the current environment where the electronic apparatus is larger than or equal to a second threshold and the second threshold may be for example 2000 lux, the brightness value of the display unit can be adjusted to a second preset brightness value for example 40 nit based on the first brightness parameter and the first environment brightness parameter in the first display parameter, so that the user can see the display object on the display unit clearly in condition of illumination of 2000 lux.

Of course, in practical application, when the display unit is adjusted according to the first display parameter and the first environment brightness, entire screen of the display unit may be adjusted, or the first display region in which the first display object is adjusted, and the embodiment of the present invention does not make any restriction here.

It can be seen from the above-described part that, since the technical solution in which the first display parameter is obtained according to the first type information of the first display object and the first display object is displayed on the first display region based on at least the first display parameter is adopted, the electronic apparatus does not need to adjust the display settings of the display unit according to the adjusting instruction input by the user to change the display effects of the electronic apparatus, so it solves technical problem that the operational steps is complex and time is wasted in the manner of adjusting the display settings in the prior arts, and implements technical effect of adjusting the display settings of the display unit automatically according to the display object on the display unit.

It is to be noted that, the numerical value in the present embodiment is only example, those skilled in the art can modify the settings of the respective numerical value in the present embodiment according to practical situation to satisfy the need of practical situation with the introduction of the present embodiment, and it is no longer described for simplicity of the specification.

Based on a same inventive concept, the second embodiment of the present invention further provides an electronic apparatus. With reference to FIG. 6, FIG. 6 is a functional block diagram of the electronic apparatus provided by the second embodiment of the present invention. The electronic apparatus includes: a case 601; a circuit board 602 provided in the case 601; a display unit 603 connected to the circuit board 602; a processor 604 provided on the circuit board 602 and for acquiring first type information of a first display object on a first display region of the display unit 603, and obtaining first display parameter corresponding to the first type information based on correspondence relationship between the type information and display parameter, and displaying the first display object on the first display region based on at least the first display parameter corresponding to the first type information.

In the specific implementation procedure, before displaying the first display object on the first display region based on at least the first display parameter, the processor 604 is further specifically for obtaining a first environment brightness parameter of current environment where the electronic apparatus is; and displaying the first display object on the first display region based on the first display parameter and the first environment brightness parameter.

In the specific implementation procedure, the processor 604 is specifically for displaying the first display object on the first display region based on the first display parameter and the first environment brightness parameter.

In the specific implementation procedure, when the first environment brightness parameter indicates that illumination of the current environment is less than or equal to a first threshold, the processor 604 is specifically for adjusting a brightness value of the display unit 603 to a first preset brightness value based on the first brightness parameter and the first environment brightness parameter.

In the specific implementation procedure, when the first environment brightness parameter indicates that illumination of the current environment is larger than or equal to a second threshold, the processor 604 is specifically for adjusting the brightness value of the display unit 603 to a second preset brightness value based on the first brightness parameter and the first environment brightness parameter.

The electronic apparatus of the present embodiment and the display method of the present embodiment are based on two aspects under a same inventive concept, since the implementation procedure of the display method is described detailed previously, those skilled in the art can understand the structure and implementation procedure of the electronic apparatus of the present embodiment clearly according to the above description, and it is no longer described for simplicity of the specification.

The technical solutions in the above second embodiment of the present application at least have the following technical effect or advantage:

Since the technical solution in which the first display parameter is obtained according to the first type information of the first display object and the first display object is displayed on the first display region based on at least the first display parameter is adopted, the electronic apparatus does not need to adjust the display settings of the display unit according to the adjusting instruction input by the user to change the display effects of the electronic apparatus, so it solves technical problem that the operational steps is complex and time is wasted in the manner of adjusting the display settings in the prior arts, and implements technical effect of adjusting the display settings of the display unit automatically according to the display object on the display unit.

Here, the above-described display method and electronic apparatus according to the first embodiment of the present invention and the display method and the electronic apparatus according to the second embodiment of the present invention can be applied individually, or can be applied in combination with each other. For example, in the display method and the electronic apparatus according to the first embodiment of the present invention, after adjusting the display mode from the first display mode to the second display mode based on the first parameter information of the first application, the display object can be displayed further based on the type information of the display object. For example, in the above example of the application "WORD", other than displaying the object of the type of text, the object of the type of picture may be displayed in certain cases. Thus, after adjusting the display mode according to the parameter information of the application "WORD", the display object can be displayed according to the difference of the display object in the adjusted display mode.

And, the adjustment of the display according to the parameter information of the application and the type information of the display object may be carried out synchronously. For example, when the user clicks a certain "WORD" document, the electronic apparatus open the "WORD" document of the type of text by the application "WORD". At this time, the display mode of the document can be adjusted according to the parameter information of the application "WORD" and the type information of the "WORD" document at the same time, so as to obtain an optimal display effect.

Those skilled in the art should understand that, the embodiment of the present invention can be provided as method, system or computer program product. Therefore, the present invention can adopt forms of full hardware embodiment, full software embodiment, or embodiment combining software and hardware aspects. And, the present invention can adopt form of one or more computer program product implemented on a computer usable storage medium (includes, but not limited to magnetic disk storage, CD-ROM, optical memory or the like) including computer usable program code.

The present invention is described by referring to flow chart and/or block diagram of method, apparatus (system) and computer program product according to the embodiments of the present invention. It should understand that each flow and/or block in the flow chart and/or block diagram and the combination of the flow and/or block in the flow chart and/or block diagram can be implemented by computer program instruction. The computer program instruction can be provided to processors of a general purpose computer, a dedicated computer, an embedded processor or other programmable data processing apparatus to generate a machine, so that a device for implementing the functions specified in one or more flow of the flow chart and/or one or more block of the block diagram is generated by the instruction executed by the processor of the computer or other programmable data processing apparatus.

These computer program instruction can also be stored in computer readable storage which is able to direct the computer or other programmable data processing apparatus to operate in specific manners, so that the instruction stored in the computer readable storage generates manufactured article including commander equipment, the commander equipment implements the functions specified by one or more flow in the flow chart and/or one or more block in the block diagram.

The computer program instruction can be loaded to the computer or other programmable data processing apparatus, so that a series of operation steps are executed on the computer or other programmable apparatus to generate computer implemented process, so that the instruction executed on the computer or other programmable apparatus provide steps for implementing the functions specified in one or more flow of the flow chart and/or one or more block of the block diagram.

It is obvious that those skilled in the art can make various kinds of modifications and variations to the present invention without departing from the spirit and scope of the present invention. Thus, if these modifications and variations of the present invention fall within the scope of the claims of the present invention and the equivalent technology, the present invention intends to comprise these modifications and variations.

What is claimed is:

1. A display method applied in an electronic apparatus including a case, a circuit board provided in the case and connected to a display unit having various kinds of different display modes, and a processor provided on the circuit board, the display method comprises:
    initiating, by the processor, a first application in the electronic apparatus when current display mode of the display unit is a first display mode;
    obtaining first parameter information of the first application;
    determining a second display mode according to the first parameter information and preset correspondence relationship between the parameter information and the display modes;
    adjusting the display unit from the first display mode displayed currently to a second display mode which is different from the first display mode;
    acquiring a first type information of a first display object on a first display region of the display unit;
    obtaining a first display parameter corresponding to the first type information based on correspondence relationship between the type information and the display parameter;
    obtaining a first environment brightness parameter of a current environment where the electronic apparatus is located before displaying the first display object on the first display region based on at least the first display parameter; and,
    displaying the first display object on the first display region based on the first display parameter and the first environment brightness parameter.

2. The display method according to claim 1, wherein, acquiring the first parameter information of the first application comprises acquiring first display brightness parameter information of the first application.

3. The display method according to claim 2, wherein, determining the second display mode according to the first parameter information and the preset correspondence relationship between the parameter information and the display mode includes:
    deciding whether the first display brightness parameter information satisfies a preset display brightness parameter information and generating a decision result;
    determining the display mode corresponding to the first display brightness parameter information as a second display mode based on the correspondence relationship between the display brightness parameter information and the display modes if the decision result represents that the first display brightness parameter information satisfies the preset display brightness parameter information.

4. The display method according to claim 3, wherein, deciding whether the first display brightness parameter information satisfies the preset display brightness parameter information and generating the decision result comprises deciding whether the first display brightness parameter information satisfies the preset display brightness parameter information in the second display mode.

5. The display method according to claim 4, wherein, adjusting the current display mode of the display entity from the first display mode to the second display mode that is different from the first display mode comprises adjusting the display brightness parameter information of the display unit from the first display brightness parameter information in the first display mode to the preset display brightness parameter information in the second display mode.

6. The display method according to claim 5, wherein, after deciding whether the display brightness parameter information satisfies the preset display brightness parameter information of the second display mode, the method further includes: keeping the current display mode of the application as the first display mode if it decides that the first display brightness parameter information does not satisfy the preset display brightness parameter information of the second display mode.

7. The display method according to claim 1, wherein, the first display mode is a Content Adaptive Brightness Control ("CABC") MOVE display mode or a CABC UI display mode.

8. The display method according to claim 1, wherein, the second display mode is a CABC MOVE display mode or a CABC UI display mode.

9. The display method according to claim 1, wherein, the first display parameter includes at least a first color temperature parameter and a first brightness parameter, and displaying the first display object on the first display region based on the first display parameter and the first environment brightness parameter comprises adjusting a color temperature value of the display entity based on the first color temperature parameter, adjusting a brightness value of the display entity based on the first brightness parameter and the first environment brightness parameter, and displaying the first display object on the first display region of the display entity.

10. The display method according to claim 9, wherein, when the first environment brightness parameter indicates that the illumination of the current environment is less than or equal to a first threshold, adjusting the brightness value of the display unit based on the first brightness parameter and the first environment brightness parameter comprises adjusting the brightness value of the display unit to a first preset brightness value based on the first brightness parameter and the first environment brightness parameter.

11. The display method according to claim 10, wherein, when the first environment brightness parameter indicates that the illumination of the current environment is larger than or equal to a second threshold, adjusting the brightness value of the display unit based on the first brightness parameter and the first environment brightness parameter comprises adjusting the brightness value of the display unit to a second preset brightness value based on the first brightness parameter and the first environment brightness parameter.

12. An electronic apparatus including a display unit at least having various kinds of different display modes, the electronic apparatus further comprises:
a case;
a circuit board provided in the case and connected to the display unit;
a processor provided on the circuit board for
initiating a first application in the electronic apparatus when current display mode of the display unit is a first display mode;
obtaining first parameter information of the first application;
determining a second display mode according to the first parameter information and preset correspondence relationship between the parameter information and the display modes;
adjusting the display unit from the first display mode displayed currently to a second display mode which is different from the first display mode;
acquiring a first type information of a first display object on a first display region of the display unit and obtaining a first display parameter corresponding to the first type information based on a correspondence relationship between the type information and the display parameter and displaying the first display object on the first display region based on at least the first display parameter,
obtaining a first environment brightness parameter of current environment where the electronic apparatus is located, before displaying the first display object on the first display region based on at least the first display parameter, the processor; and,
displaying the first display object on the first display region based on the first display parameter and the first environment brightness parameter.

13. The electronic apparatus according to claim 12, wherein, the processor:
decides whether the first display brightness parameter information satisfies the preset display brightness parameter information and generates a decision result;
determines the display mode corresponding to the first display brightness parameter information as the second display mode based on the correspondence relationship between the display brightness parameter information and the display modes if the decision result represents that the first display brightness parameter information satisfies the preset display brightness parameter information.

14. The electronic apparatus according to claim 12, wherein, the processor is configured to display the first display object on the first display region based on the first display parameter and the first environment brightness parameter.

15. A display method applied in an electronic apparatus including a case, a circuit board provided in the case and connected to a display unit having various kinds of different display modes, and a processor provided on the circuit board, the display method performed by the processor comprises:
initiating, by the processor, a first application in the electronic apparatus when current display mode of the display unit is a first display mode in case that and the user runs a first display object with the first application;
obtaining first parameter information of the first application; acquiring first type information of the first display object on a first display region of the display unit;
determining a second display mode according to the first parameter information and preset correspondence relationship between the parameter information and the display modes;
obtaining first display parameter corresponding to the first type information based on correspondence relationship between the type information and the display parameter;
adjusting the display unit from the first display mode displayed currently to the second display mode that is different from the first display mode, wherein, the first display object is displayed on the first display region based on at least the first display parameter in the second display mode;
obtaining a first environment brightness parameter of a current environment where the electronic apparatus is located before displaying the first display object on the first display region based on at least the first display parameter; and,
displaying the first display object on the first display region based on the first display parameter and the first environment brightness parameter.

* * * * *